Oct. 12, 1965 H. LIEBERMAN ETAL 3,210,860
MOUNTING MEANS FOR AN INTERCHANGEABLE REMOTE
COMPASS SIGNAL TRANSMITTER
Filed May 7, 1962 2 Sheets-Sheet 1

INVENTORS
HERMAN LIEBERMAN
IRVING R. WEIR

BY *Herbert L. Davis*
ATTORNEY

INVENTORS
HERMAN LIEBERMAN
IRVING R. WEIR

BY Herbert L. Davis
ATTORNEY

United States Patent Office 3,210,860
Patented Oct. 12, 1965

3,210,860
MOUNTING MEANS FOR AN INTERCHANGE-
ABLE REMOTE COMPASS SIGNAL TRANS-
MITTER
Herman Lieberman, Fort Lee, and Irving R. Weir,
Pompton Plains, N.J., assignors to The Bendix Corpo-
ration, Teterboro, N.J., a corporation of Delaware
Filed May 7, 1962, Ser. No. 192,844
2 Claims. (Cl. 33—224)

The invention relates to a novel mounting means for an interchangeable remote compass signal transmitter, and more particularly to a novel ring arrangement for mounting such a remote compass signal transmitter on an aircraft so as to permit compass signal transmitter interchangeability without the need for reswinging the aircraft on a compass rose to calibrate the replacement compass signal transmitter for compass error.

In such an arrangement, it has been found that a compass error is caused by nearby magnetic influences, as those related to magnetic material in the structure of the aircraft, and electrical circuits. These magnetic forces may so affect a compass signal transmitter as to deflect a compass needle operated by a signal receiver from its normal alignment with a magnetic meridian.

Since deviation depends upon the distribution of magnetic forces in the aircraft itself, deviation must be obtained individually for each magnetic compass on each aircraft. The process of determining such compass deviation is known as swinging. Moreover, compass deviation varies with heading and is the deflection of a compass needle from a position of magnetic north as a result of a local magnetic disturbance, measured from magnetic north and designated east or west.

The compass rose is a graduated circle, usually marked in degrees, indicating directions. Such a circle is marked off on the ground to assist in ground swinging. The compass rose is used to measure the angle from the compass needle to a heading, while compass swinging is a procedure whereby a compass is turned from one magnetic heading to another in a horizontal plane to determine deviation. With airplane compasses, the compass remains in the airplane and the plane is swung about. Deviation is usually determined on 24 different headings. Compass swinging in an airplane may be done by air swinging but is preferably done for greater accuracy by ground swinging of the aircraft on the compass rose.

Heretofore, whenever a compass signal transmitter required replacement on an aircraft because of malfunction or overhauling requirements, an elaborate compass transmitter and aircraft ground swinging procedure was required with ensuing cost in time and money in order to accurately calibrate and thereafter readjust the compasss signal transmitter in relation to the aircraft so as to correct for compass deviation and in order that the indicator of the compass receiver may more accurately indicate in response to the operation of the compass signal transmitter a magnetic north heading position of the aircraft.

In the prior arrangement, whenever the compass signal transmitter was replaced, it was necessary to recalibrate the replacement compass signal transmitter in its relationship to the lubber line of the compass indicator and the north or several compass heading positions of the aircraft before the replacement compass signal transmitter may be properly secured in an adjusted position of the aircraft. This recalibrating procedure entailed the positioning of the aircraft on and about a compass rose in a technique known in the art as compass swinging so that operational personnel may properly calibrate and orient the compass signal transmitter in relation to the aircraft and in which the relation of the lubber line to the magnetic north heading of the aircraft as sensed by the compass signal transmitter are meticulously readjusted so as to correct for deviations in the output signal of the compass transmitter due to (1) minute misalignment of the compass transmitter; (2) inherent deviation in the compass transmitter; (3) deviation due to local disturbances in the earth's magnetic field in the aircraft; and (4) cyclic errors in the system controlled by the compass signal transmitter.

The lubber line is a mark or line on a compass indicator, which, when the compass is properly placed in an aircraft, represents the heading of the aircraft. Therefore, the compass lubber line, and the fore-aft axis or longitudinal axis of the airplane should be coincident. The procedure for accomplishing this involves a precise and accurate alignment of the compass transmitter. The alignment error is constant on all headings. It is caused by an incorrectly placed lubber line and is the mean of deviation on all headings.

Alignment error =
$$\frac{\text{algebraic sum of deviation on compensation points}}{\text{number of compensation points}}$$

and usually 24 points are utilized. However, for expediting operation of the compass signal transmitter, sometimes only the 4 cardinal headings are used. At other times the 4 cardinal headings and 4 intercardinal headings for a total of 8 headings are used.

Compass deviation may be caused by local magnetism in the airplane and may vary with the heading of the airplane. This local magnetism is due to magnetic induction in the airplane's material and to the magnetic fields set up by the currents in electrical wiring. Compass deviation is the angular difference between the reading of the compass indicator and the actual magnetic heading of the airplane. This difference is called plus or minus (east or west, respectively) and is applied as a correction to the indicator to obtain the actual magnetic heading.

In effecting the foregoing correction, there is first tabulated the deviation at each heading. The deviations may then be algebraically added and the resultant sum divided by the number of headings. This provides a figure which represents the alignment error and with the airplane at a cardinal heading the compass signal transmitter may then be turned or slewed an amount equivalent to the alignment error so as to correct for the compass deviation.

The novel mounting ring arrangement permits the transmitter to be aligned properly during the original swinging procedure by appropriate adjustment of the mounting ring, and thereafter, maintains this alignment even if the transmitter is removed or replaced by a second or like compass signal transmitter so that the mounting ring, as originally adjusted, effects the necessary compass deviation correction for the replacement transmitter.

In the prior arrangement, however, each time that the compass signal transmitter was replaced, this elaborate compass swinging procedure which involves the expenditure of considerable time and man power, was required as well as the provision of the necessary site of such a compass rose. Often, the route over which the aircraft may be required to fly may not provide at the landing depots thereon, especially in remote areas, the necessary site facilities for a compass rose.

The innovation in the present invention would avoid the foregoing shortcomings in that the elaborate compass swinging procedure is required only in connection with the initial installation of the compass signal transmitter, so that after the compass signal transmitter has been initially installed in the aircraft in the proper operating relation, the arrangement is such that there is no longer required subsequent compass swinging operations upon the installation of a replacement compass signal transmitter.

An object of the present invention is to provide a novel mounting ring whereby a compass signal transmitter may be initially mounted in proper orientation to the aircraft by appropriate adjustment of the mounting ring, and thereafter, may be replaced in the mounting ring by another and like compass signal transmitter which will not require subsequent compass swinging operations or further adjustment of the mounting ring to correct for compass deviation upon the installation of the replacement compass signal transmitter in the mounting ring as initially adjusted.

An object of the present invention is to provide a novel mounting ring whereby a compass signal transmitter may be initially mounted in proper orientation to the aircraft so as to correct for compass deviation, and thereafter, may be replaced in the mounting ring by another and like compass signal transmitter which will be so oriented by the mounting ring in its adjusted position in relation to the aircraft that the compass signal receiver connected in cooperative relation therewith may accurately indicate a magnetic north heading of the aircraft without the necessity of additional compass swinging operations of the compass signal transmitter and aircraft or compass deviation correction.

Another object of the invention is to provide a novel mounting ring for a compass signal transmitter from which the transmitter may be effectively removed from suitable mating brackets, and in which upon the compass signal transmitter or its replacement being rejoined with the mating brackets of the mounting ring, the replacement transmitter may be properly oriented relative to the aircraft so as to correct for the compass deviation and permit interchangeability of the compass signal transmitter with a like replacement compass signal transmitter and without the necessity for reswinging the aircraft to effect a further correction thereof.

These and other objects and features of the invention are pointed out in the following description in terms of the embodiment thereof which is shown in the accompanying drawings. It is to be understood, however, that the drawings are for the purpose of illustration only and are not a definition of the limits of the invention.

Figure 1:
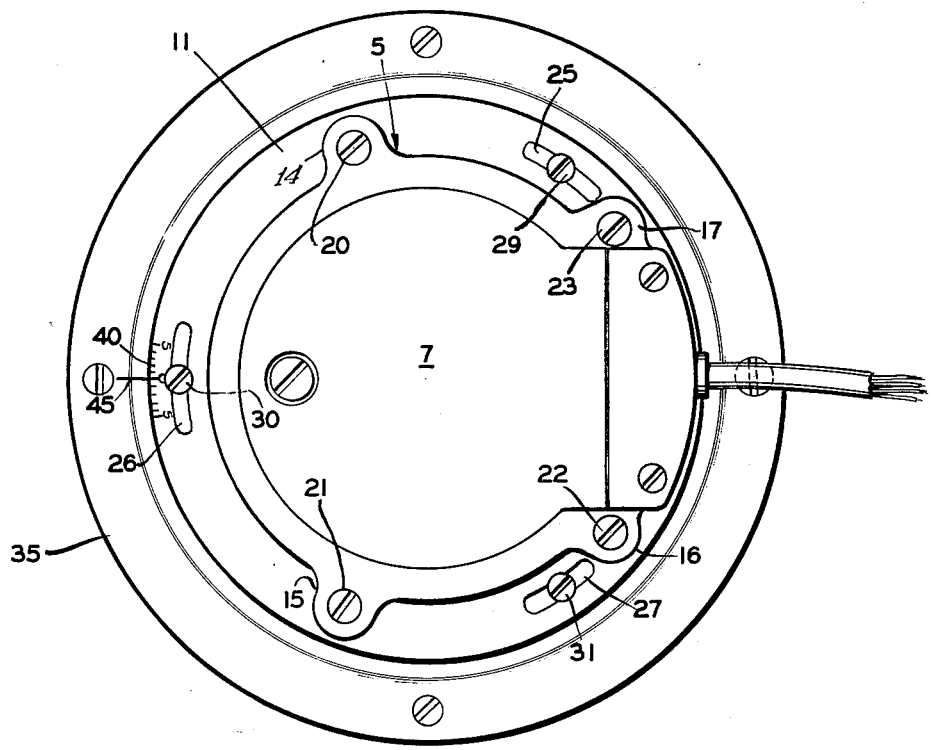
FIGURE 1 is a top plan view of a compass signal transmitter in assembled position in a novel mounting ring and shown in assembled position on a mounting bracket carried by a wing of an aircraft, a fragmentary portion of which is shown in the drawing.
Figure 2:
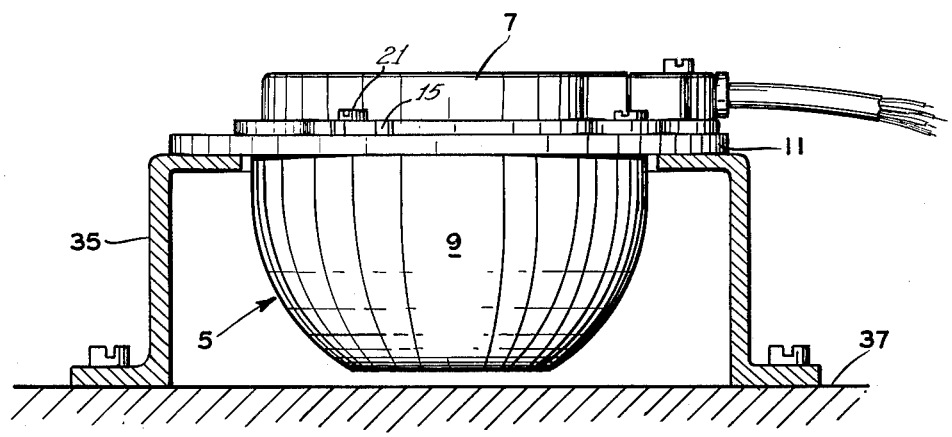
FIGURE 2 is a side view of the compass transmitter of FIGURE 1 in which the mounting bracket is shown in elevation together with a fragmentary sectional view of the wing of the aircraft.

Referring to the drawings, the compass signal transmitter indicated generally by the numeral 5 may be of a type disclosed and claimed in U.S. Patent No. 2,755,562, dated July 24, 1956, to Charles E. Hurlburt, and assigned to The Bendix Corporation and may include a main housing section 7, and a lower cover section 9.

Figure 3:
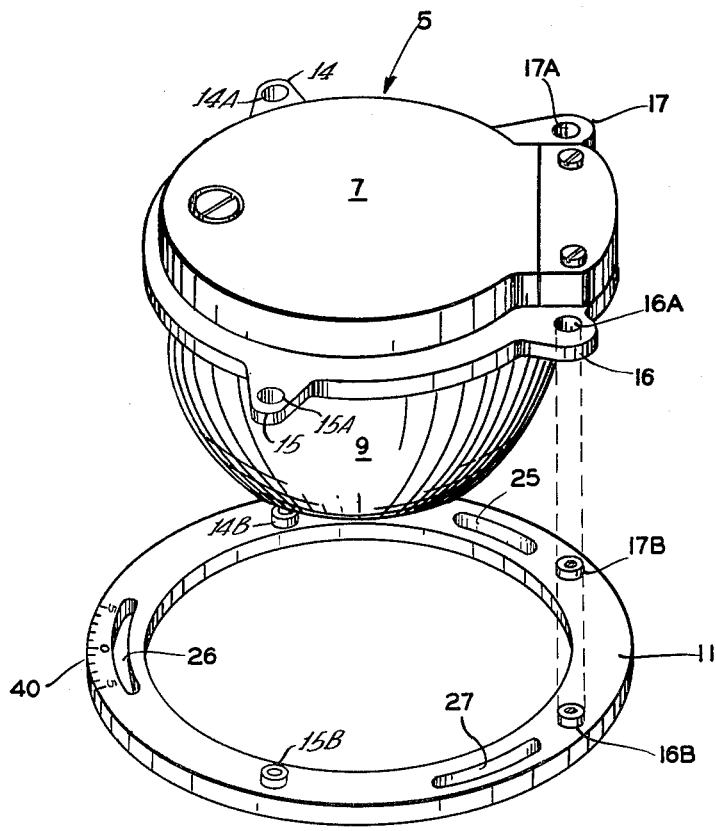
FIGURE 3 is an exploded view showing the compass transmitter and novel mounting ring in a detached position to better illustrate the structure thereof.

The main housing section 7 contains therein a suspension assembly including suitable flux elements and a balance weight for the remote compass signal transmitter, as shown in the aforenoted patent, and further has provided exteriorly thereof suitable brackets 14, 15, 16, and 17 having openings therein 14A, 15A, 16A, and 17A arranged to precisely mate with stub portions 14B, 15B, 16B, and 17B which project from the mounting ring 11, as shown in FIGURE 3.

The main section 7 may be secured in position on the stub portions 14B, 15B, 16B, and 17B of the mounting ring 11 by suitable bolts 20, 21, 22, and 23, as shown in FIGURE 1. The arrangement is such that only one mating configuration is possible between the mating brackets 14, 15, 16, and 17 and the corresponding stub portions 14B, 15B, 16B, and 17B of the mounting ring 11 because of a nonsymmetrical spacing of the brackets of the housing 7 and the respective stub portions on the mounting ring 11.

Further, the mounting ring 11 has provided three arcuate slots 25, 26, and 27 for receiving therein three fastening bolts 29, 30, and 31 for securing the mounting ring 11 and compass transmitter 5 in a precise adjusted position on a bracket 35 fastened to a portion of the aircraft such as wing 37 thereof.

Index markings 40 are further provided on the mounting ring 11 and arranged in cooperative relation with an inscribed line 45 on the bracket 35 extending parallel to the longitudinal axis of the aircraft so that the compass signal transmitter 5 in the mounting ring 11 may be initially adjusted so that the zero line of index 40 coincides with the inscribed line 45 during the initial compass swinging procedure.

The suspension assembly supported by the main housing section 7 may include as shown in the aforenoted patent a suitable flux element supported by a pair of gimbals rotatable about mutually perpendicular axes and a permanent magnet associated therewith and mounted for rotation about the axis of the flux element and positioned in a plane parallel to the plane of the flux element. The magnet may be supported at a point coinciding with the point of intersection of the gimbal axes. The magnet and flux element may be immersed in a viscous fluid carried by the lower cover section 9 to damp their movements.

The compass system may include a servo motor having driving means for operating a compass pointer or indicator. The servo motor may be connected across an alternating power source and driven in one direction thereby when the signal from the flux element as determined by the position of the flux element in the magnetic field is of one phase. When the flux element is positioned in the magnetic field so that the signal induced therein is of the opposite phase a suitable amplifier energizes the servo motor and driving means for rotation in the opposite direction in opposition to the power source.

In the assembly and calibration procedure, the mounting ring 11 is incorporated as an integral part of a test stand in a precise manner; i.e., the "0" mark of the index 40 and the magnetic north heading of the transmitters are aligned meticulously. Then, the assembled transmitter supported by the main housing 7, minus the lower cover 9, is secured to the mounting ring 11 with four screws 20, 21, 22, and 23. The upper gimbal bracket of the suspension assembly, shown in the aforenoted patent, and in turn the flux elements are oriented with respect to the magnetic north reference. After a spread check is performed, the flux element coil assembly is adjusted in such a manner as to provide the same index error among all compass signal transmitters. The assembled main housing 7 and lower cover 9 form a transmitter unit 5 that may be readily separated from the mounting ring 11. The foregoing permits a more accurate alignment, consistency among units, tighter tolerances for the index error and the interchangeability feature.

Figure 4:
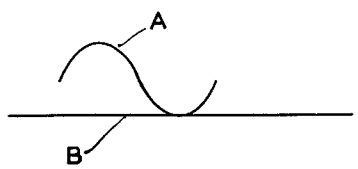
FIGURE 4 is a graphical showing illustrating an example of the deviation curve in the output signal of a compass signal transmitter from a desired linear output signal during compass swinging.
Figure 5:
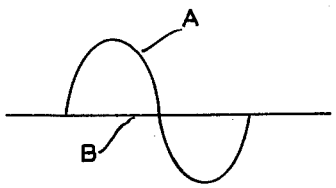
FIGURE 5 is a graphical showing illustrating a correction in the output signal deviation curve relative to the desired output signal curve of FIGURE 4 effected by appropriate slewing of the compass signal transmitter.

When the compass transmitter 5 is mounted in the aircraft and the aircraft carrying the compass transmitter 5 is swung on the compass rose, there may be effected a deviation in the electrical output signal from the compass transmitter 5 as the aircraft is adjustably positioned or swung about the compass rose which may be plotted as a curve A indicated graphically in FIGURE 4 and which may fall to one side or the other of a desired linear output signal indicated by a line B. However, upon the transmitter 5 being slewed in the mounting ring 11 by a precise and appropriate adjustment of the transmitter 5 in a proper sense, the deviation index error curve A may be adjusted relative to the desired linear output signal indicated by the line B of FIGURE 5 so that the error curve A falls equally at opposite sides of the desired linear output signal indicated by the line B and thereby lessen the margin of error in the output signal from that of the desired output signal.

The compass swinging procedure is only required with the initial installation of the compass signal transmitter 5. The transmitter 5 in its mounting ring 11 may then be slewed by a precise and appropriate adjustment of the index markings 40 relative to the enscribed line 45 so as to shift the curve A corresponding to the index error in the output signal from the compass signal transmitter 5 during the swinging procedure and relative to the desired output signal B, as shown graphically in FIGURE 5. Whereupon the transmitter 5 is fastened at the desired corrected position to the aircraft at the slots 25, 26, and 27 of the mounting ring 11 by bolts 29, 30, and 31, and thereafter, the mounting ring 11 is in effect an integral part of the aircraft.

Furthermore, in the prior calibration of the transmitter 5 on a test stand, as well as in the calibration on the test stand of like replacement transmitters therefor, the flux element coil assembly within the respective transmitters which may be of a type such as shown in the Hurlburt U.S. Patent No. 2,755,562, is so adjusted as to meticulously align the magnetic north heading of the respective transmitters with the zero or "0" mark of the index 40 on the mounting ring 11. This permits an interchangeability of such like calibrated transmitters in the mounting ring 11 after the initial adjustment of the mounting ring 11 to correct for compass deviation due to local magnetism conditions in the aircraft, as heretofore explained.

Thus, whenever a transmitter 5 requires removal or replacement, it is performed by removing the transmitter 5 from the mounting ring 11 at the mating brackets 14, 15, 16, and 17. The transmitter 5 or its like calibrated replacement, when rejoined with the mounting ring 11, is properly oriented then by the initial adjustment of the mounting ring 11 relative to the enscribed line 45 to correct for compass deviation due to local magnetism in the aircraft. This procedure permits interchangeability of the compass signal transmitter 5 without the necessity for re-swinging the aircraft on the compass rose.

Although only one embodiment of the invention has been illustrated and described, various changes in the form and relative arrangement of the parts, which will now appear to those skilled in the art may be made without departing from the scope of the invention. Reference is therefore, to be had to the appended claims for a definition of the limits of the invention.

What is claimed is:

1. Means for mounting an interchangeable remote magnetic compass signal transmitter on an aircraft, comprising a mounting plate having arcuate slots therein, a bracket for supporting the mounting plate on the aircraft, fastening bolts projecting from the bracket and adjustably mounted in said arcuate slots for securing said mounting plate in an adjusted fixed position relative to the craft, non-symmetrically spaced mounting posts projecting from the mounting plate, complementary non-symmetrically spaced brackets secured to the signal transmitter and having openings, providing thereby only one mating configuration between said posts and the openings of said brackets and including fastening means for releasably mounting the signal transmitter on the mounting plate, said mounting plate and said bracket including cooperating means for indicating an angular adjusted position of the mounting plate relative to the longitudinal axis of the aircraft to correct for deviations in the magnetic compass signal transmitter due to local magnetism conditions in the aircraft.

2. Means for mounting an interchangeable remote magnetic compass signal transmitter on an aircraft, comprising a mounting plate having arcuate slots therein a bracket for supporting the mounting plate on the aircraft, fastening bolts projecting from the bracket and adjustably mounted in said arcuate slots for securing said mounting plate in an adjusted fixed position relative to the craft, non-symmetrically spaced mounting posts projecting from the mounting plate, complementary non-symmetrically spaced brackets secured to the signal transmitter and having openings, providing thereby only one mating configuration between said posts and the open- of said brackets and including fastening means for releasably mounting the signal transmitter on the mounting plate, said mounting plate having indicia thereon, and said bracket having an indicator line thereon extending parallel to a longitudinal axis of the aircraft so arranged in cooperative relation with the indicia on said mounting plate so as to indicate an angular adjusted position of the mounting plate relative to the longitudinal axis of the aircraft to correct for deviations in the magnetic compass signal transmitter due to local magnetism conditions in the aircraft.

References Cited by the Examiner

UNITED STATES PATENTS

| | | | |
|---|---|---|---|
| 1,400,155 | 12/21 | Greenburg. | |
| 1,441,279 | 1/23 | Hammarlund | 248—27 XR |
| 2,178,623 | 11/39 | Carter | 33—204 |
| 2,755,562 | 7/56 | Hurlburt | 33—222 |

FOREIGN PATENTS

| | | |
|---|---|---|
| 544,937 | 7/22 | France. |
| 453,472 | 12/27 | Germany. |
| 178,674 | 4/22 | Great Britain. |
| 410,457 | 19/34 | Great Britain. |
| 664,635 | 1/52 | Great Britain. |

ROBERT B. HULL, *Primary Examiner.*